United States Patent [19]

Schwartzman et al.

[11] 4,125,050

[45] Nov. 14, 1978

[54] SELF-DRILLING SCREW

[75] Inventors: Irwin J. Schwartzman, Northridge; Paul K. Wilgermein, Van Nuys, both of Calif.

[73] Assignee: J. Schwartzman Manufacturing & Supply Co., North Hollywood, Calif.

[21] Appl. No.: 803,801

[22] Filed: Jun. 6, 1977

[51] Int. Cl.$^2$ ............................................. F16B 25/00
[52] U.S. Cl. ......................................... 85/41; 408/228
[58] Field of Search ................... 85/41, 47; 10/10 R; 408/228, 227, 226, 229, 230

[56] References Cited

U.S. PATENT DOCUMENTS

| | | | |
|---|---|---|---|
| 2,401,307 | 6/1946 | Manewich | 408/229 |
| 3,395,603 | 8/1968 | Skierski | 85/47 |
| 3,517,581 | 6/1970 | Stokes et al. | 85/47 |
| 3,578,762 | 5/1971 | Siebol et al. | 85/41 |
| 3,665,801 | 5/1972 | Gutshall | 85/41 |
| 3,786,713 | 1/1974 | Sygnator | 85/41 |

*Primary Examiner*—Ramon S. Britts
*Attorney, Agent, or Firm*—Whann & McManigal

[57] ABSTRACT

A self-drilling screw having an elongated threaded shank with a driving head at one end and a drilling body portion at its other end formed with longitudinally extending flutes located substantially on opposite sides of the body, these flutes defining rectilinear tip and side cutting edges positioned along opposite sides of the body, the tip-cutting edges being forwardly offset and angularly diverging from the ends of a transverse cutting edge, formed on a tip web, to diametral opposite points on the body providing a transverse width at least equal to the root diameter of the threads on the shank, and at which points the tip-cutting edges connect with the side-cutting edges which are angularly inclined towards their outer ends in a rearward direction circumferentially of the body and in a radially inwardly direction of said body. Narrow inwardly inclined relief planar surfaces parallel the respective cutting edges, and are augmented by a plurality of additional contiguous back relief planar surfaces of greater angular inclination than the relief surfaces extending immediately along the cutting edges.

7 Claims, 4 Drawing Figures

SELF-DRILLING SCREW

PRIOR ART

In the prior art there are numerous screw structures which are formed with a drilling end portion to provide a selfdrilling screw embodiment. The closest art known to applicants are the following patents:

| United States Patents | | |
| --- | --- | --- |
| 3,125,923 | - | March 24, 1964 |
| 3,318,182 | - | May 9, 1967 |
| 3,241,426 | - | March 22, 1966 |
| 3,463,045 | - | August 26, 1969 |
| 3,710,676 | - | January 16, 1973 |
| 3,747,143 | - | July 24, 1973 |
| 3,079,831 | - | March 5, 1963 |
| 3,782,056 | - | January 1, 1974 |
| 3,786,713 | - | January 22, 1974 |
| 3,812,639 | - | May 28, 1974 |
| 3,882,756 | - | May 13, 1975 |
| 3,933,075 | - | January 20, 1976 |
| Foreign Patents | | |
| 690,269 - Gr. Britain | | - April, 1953 |
| 976,849 - Gr. Britain | | - December, 1964 |
| 639,198 - Italy | | - May, 1962 |

BACKGROUND OF THE INVENTION

The present invention relates generally to the field of threaded fasteners.

A study of the prior art patents reveals that a formidable amount of time and attention has been directed to the improvements of such design features, for example, as would facilitate forging operations during fabrications, the use of elements to break up the drilling chips, as well as others, which would and have undoubtedly contributed to the advancement of the art as it relates to the field of self-drilling screws.

We have discovered, however, that the prior developments have noticeably overlooked or neglected to consider the deleterious effects of drag or friction inherent in the conventional self-drilling screws.

In the present invention, we have therefore provided a unique arrangement of the cutting edges in relation to angularly extending associated relief surfaces such that the friction drag, heating, work-hardening and other inherent undesirable characteristics of the conventionally available self-threading screws will be materially reduced, and that as a result the selfthreading screws constructed in accordance with the features of our present invention will have improved operating characteristics.

SUMMARY OF THE INVENTION

The present invention is more specifically concerned with improvements in the drilling end of threaded fasteners of the self-drilling screw type.

One object of the herein described invention is to provide a self-drilling screw having improved and more efficient operating characteristics.

A further object resides in the provision of a self-drilling screw in which the tip and side-cutting edges of the drilling portion of the screw are rectilinear and are provided with a plurality of unique angularly extending planar relief surfaces which permit the flow of removed material away from the cutting edges.

A further object is to provide a self-drilling screw in which the cutting edges and associated angularly positioned relief surface areas are so arranged as to reduce the frictional drag and the concomitant development of heat, to the end that the probability of work hardening of the drilled material will be advantageously reduced, and the cutting edges will retain their sharpness and effectiveness.

Another object is to provide a drilling screw having a drilling end portion in which the converging tip-cutting edges are associated with a transverse cutting edge of a tip web in a manner such that the friction and drag on the entire drilling point will be substantially reduced, and in which the screw will stabilize quickly and have little or no tendency to walk during the starting of the drilling operation.

Still another object is to provide a self-drilling screw in which the cutting edges and associated angular relief surfaces are relatively so positioned that the use of forging operations, during fabrication, will result in the production of stronger, harder and sharper cutting edges.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only.

DESCRIPTION OF A PREFERRED EMBODIMENT

Figure 1:
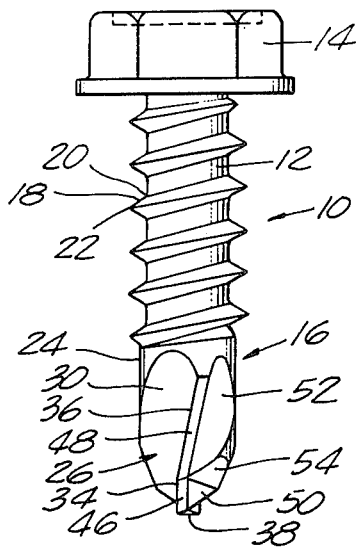
FIG. 1 is a side elevational view showing a selfdrilling screw incorporating features of the present invention.

Referring more specifically to the drawings, for illustrative purposes, the self-drilling screw, as generally indicated by the numeral 10, embodies an elongated shank portion 12 which is formed at one end with an appropriate driving head 14, and at its other end with a drilling portion 16.

The shank portion 12 is fabricated to provide helical thread convolutions 18 thereon, these convolutions preferably extending from adjacent the driving head to the drilling portion 16, and being formed to provide a root diameter 20 which is substantially coincident with the outer surface of the shank portion 12, and a crest diameter 22.

The drilling portion 16 is formed preferably by a forging operation to provide a generally cylindrical body 24 which preferably has a maximum diameter which is slightly greater than the root diameter of the threads 18.

Figure 3:
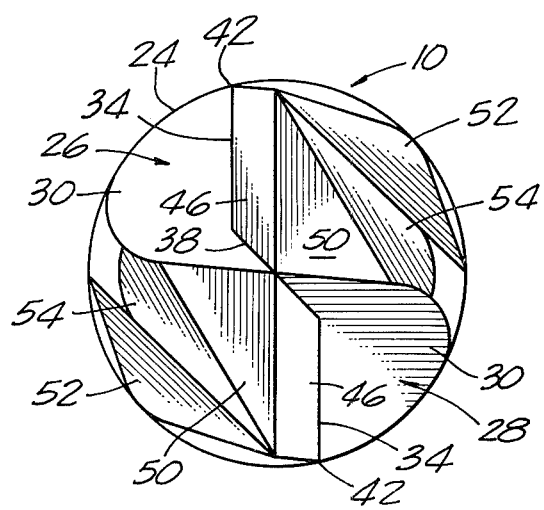
FIG. 3 is an end view of the screw as shown in FIG. 2, and as seen from line 3—3 of FIG. 2.

The body 24 is formed with longitudinally extending flutes 26 and 28, as best shown in FIG. 3, which are located substantially on opposite sides of the body 24. Each flute comprises an elongate recess in the body 24, which is defined by angularly joined substantially planar wall surfaces 30 and 32 in substantially right-angled relation, the surface 32 in each case being outwardly terminated and defining a rectilinear tip-cutting edge 34 and rectilinear side-cutting edge 36.

Figure 2:
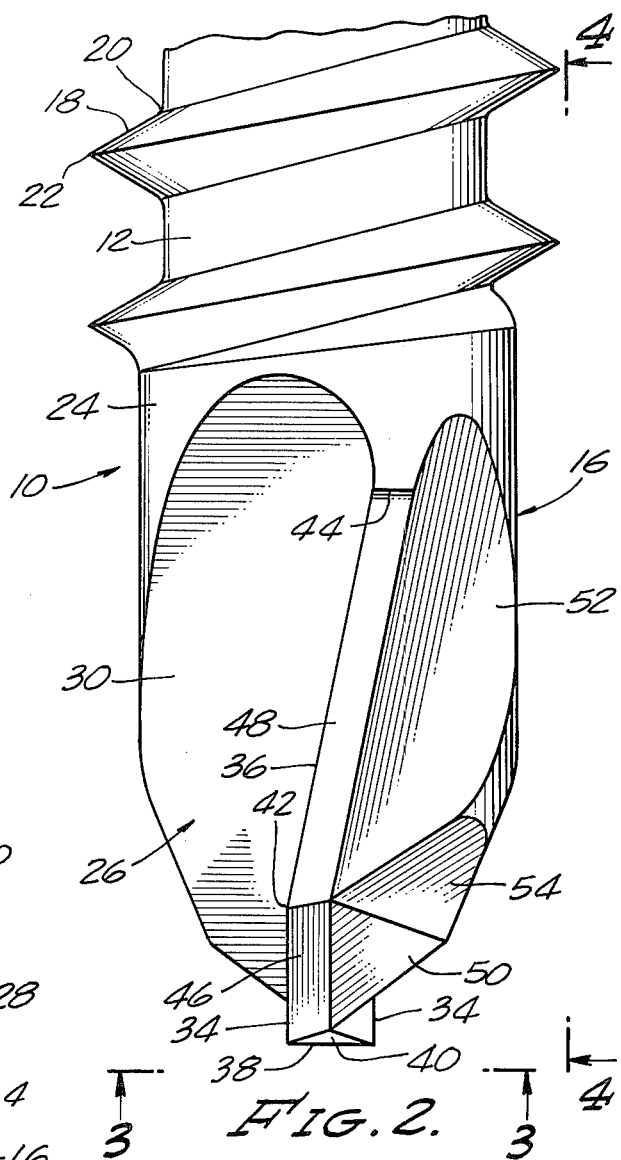
FIG. 2 is an enlarged fragmentary elevational view similar to FIG. 1, showing details of the drilling end portion thereof.
Figure 4:
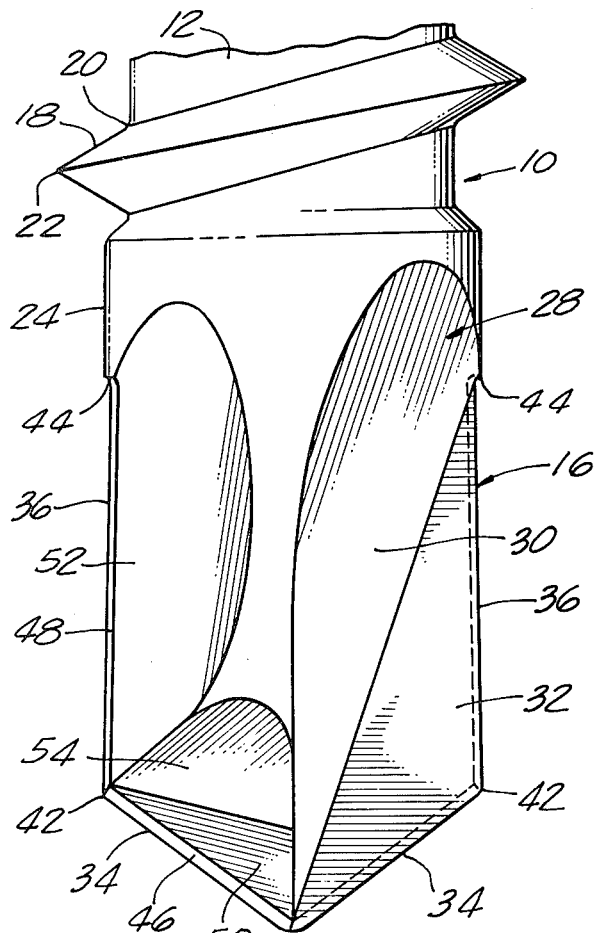
FIG. 4 is an enlarged fragmentary elevational view of the drilling end portion as seen from line 4—4 of FIG. 2.

As best shown in FIG. 3, the tip-cutting edges 34, 34, are forwardly offset and lie in substantially parallel planes. At their inner ends, the tip-cutting edges extend outwardly in diverging directions from the ends of a transversely extending point-cutting edge 38 formed on an interconnecting tip web 40. The tip-cutting edges 34 extend outwardly to diametrically opposite outer points 42 on the body 24 which provide a maximum transverse cutting width at least equal to the root diameter of the threads 18 of the screw shank. At these points, each of the tip-cutting edges connects with the inner end of a side-cutting edge 36. Each of the side-cutting edges 36, as shown in FIG. 2, has a rake angle in a rearward direction circumferentially of the body 24, and also is radially downwardly inclined to an inner point 44 which is slightly depressed below the surface of the body 24.

An important feature of the present invention resides in the provision of a plurality of relief surfaces which extend behind the tip and side-cutting edges, these relief surfaces having planar configuration, and serving to provide space for the free movement of displaced drilled material around the entire drilling tip during a drilling operation preparatory to the threads of the screw engaging the material. As a consequence of this unique feature, friction and drag are materially decreased so that there is less possibility of causing work hardening which would tend to dull the cutting edges and undesirably resist the drilling operation by the screw. A further advantage of the screw structure is that the screw will stabilize quickly and there will be little or no tendency of the screw to walk at the beginning of the drilling operation.

More specifically, these relief surfaces include relatively narrow contiguous flat surfaces 46 and 48 which extend along and substantially parallel the tip-cutting edge 34 and side-cutting edge 36. These relief surfaces are inclined from the associated cutting edges at an angle of substantially 18°, and as arranged provide immediate relief for the material as it is removed by the cutting edges. The cutting edges are additionally relieved in the tip and side areas by additional relief areas which are formed by a back relief angularly inclined flat surface 50 in the tip area, an elongate angularly inclined flat relief surface 52 in the side area, and an angularly inclined flat relief surface 54 which extends rearwardly of the point 42 between the adjacent ends of the surfaces 50 and 52.

The relationship between each flute sidewall 32, the surfaces 46 and 48, and the relief surfaces 50, 52 and 54, has been found to be of advantage in connection with the forging operation for the formation of the cutting edges 34 and 36. The wall 36 and surfaces 50, 52 and 54 may be formed by die surfaces which coact to apply restraining side pressures while the die-forming surfaces for forming the surfaces 46 and 48 are applying pressure during the formation of cutting edges 34 and 36. With this constraining of forces, the material along the cutting edges will be hardened during the forging operation, and sharper and longer wearing cutting edges will be obtained.

A self-drilling screw according to the present invention provides a unique drilling tip that will drill faster without producing excess heat, and will reduce the tendency of the drill tip to walk. The tip-cutting edges will gradually increase the drilled opening and as the drilled material increases, the arrangement of the angular relief surfaces provides greater flow space for the removed material as the drilling progresses. This has been found to be a tremendous advantage over the conventional arrangements in which only a single relief angled surface is provided. The reduction of friction and drag prevents work hardening in the case of certain metals and thus enable the cutting edges to more effectively resist dulling during the drilling operation. The side-cutting edges and the rake angle defined by the flute wall 32 have been found to advantageously contribute to the finishing of the drilled hole and the drilling action with respect to the drawing of the drilling tip into the material being drilled.

From the foregoing description and drawings, it is believed that it will be clearly evident that the delineated objects and features of the invention will be accomplished.

Various modifications may suggest themselves to those skilled in the art without departing from the spirit of our invention, and, hence, we do not wish to be restricted to the specific form or forms shown or uses mentioned, except to the extent indicated in the appended claims.

We claim:

1. In a self-drilling screw having an elongated threaded shank with a longitudinal axis and a driving head at its rearward end and a drilling portion having a tip at its forward end, the improvement in which:
   (a) the drilling portion comprises a body having longitudinally extending flutes located substantially on opposite sides of said body;
   (b) said flutes defining rectilinear tip and side-cutting edges positioned generally on opposite sides of said body, said side-cutting edges and said tip cutting edges intersecting to define an outer point; and
   (c) a plurality of planar relief surfaces extending longitudinally behind said tip and side cutting edges, said surfaces each having a planar configuration and including a pair of first surfaces, said first surfaces being contiguous, one of said first surfaces extending along and being parallel to one of said tip cutting edges and being inclined outwardly and rearwardly from the tip and another one of said first surfaces extending along and being parallel to one of said side cutting edges and being inclined inwardly and rearwardly from said outer point for relieving material removed by said cutting edges, second inclined surfaces with a first pair of said second surfaces being located adjacent said tip cutting edge and being inclined outwardly and rearwardly from the tip, a second pair of second surfaces each being spaced from the tip and being located adjacent one of said side cutting edges and being inclined therefrom, and a pair of third inclined surfaces each extending outwardly and rearwardly of one of said side cutting edge outer points and being inclined outwardly and rearwardly of said first pair of said second surfaces and being inclined at a lesser angle with respect to the screw longitudinal axis than said first pair of second surfaces is with respect to the screw longitudinal axis, said third inclined surfaces being located between and separating adjacent ends of corresponding ones of said first and second pairs of said second inclined surfaces and being inclined with respect to said second surfaces.

2. A screw according to claim 1, in which the cutting edges include forwardly offset tip end cutting edges angularly diverging from the ends of a transverse cutting edge formed on a tip web, to diametral opposite points on said body providing a transverse width at least equal to the root diameter of the threads on said shank.

3. A screw according to claim 2, in which the cutting edges further include side-cutting edges on opposite side of said body respectively extending from the outer ends of the tip-cutting edges to points generally adjacent the inner end of the shank threads, said side-cutting edges each being angularly inclined from its connection with the tip-cutting edge, in a rearward direction circumferentially of said body and in a radially inward direction of said body.

4. A screw according to claim 3, in which the relief surfaces further include a plurality of back relief surface areas extending along and being further inclined with reference to the relief surfaces paralleling each of said tip-cutting edges and said sidecutting edges.

5. A screw according to claim 1, in which the relief surfaces are inclined at a relief angle of substantially 18°.

6. A screw according to claim 1, in which the flutes have angularly extending side walls in substantially 90° relation, and in which one of said side walls terminates in an outer edge that forms one of said tip-cutting edges and its connected side-cutting edges, and in which said side cutting edges extend outwardly beyond the root diameter of the threads of said shank.

7. A screw according to claim 1 wherein one surface of said second surface first pair, one surface of said second surface second pair, and one surface of said third surfaces converge adjacent one of said side cutting edge outer points.

* * * * *